July 2, 1940.  C. L. KEE  2,206,777
RANGE-FINDING AND PROJECTILE-RELEASING MEANS FOR AIRCRAFT
Filed Sept. 29, 1936  4 Sheets-Sheet 1

July 2, 1940.　　　　C. L. KEE　　　　2,206,777
RANGE-FINDING AND PROJECTILE-RELEASING MEANS FOR AIRCRAFT
Filed Sept. 29, 1936　　　4 Sheets-Sheet 2

July 2, 1940.     C. L. KEE     2,206,777
RANGE-FINDING AND PROJECTILE-RELEASING MEANS FOR AIRCRAFT
Filed Sept. 29, 1936     4 Sheets-Sheet 3

Inventor
Charles L. Kee
By [signature]
Attorney

July 2, 1940.  C. L. KEE  2,206,777
RANGE-FINDING AND PROJECTILE-RELEASING MEANS FOR AIRCRAFT
Filed Sept. 29, 1936  4 Sheets-Sheet 4
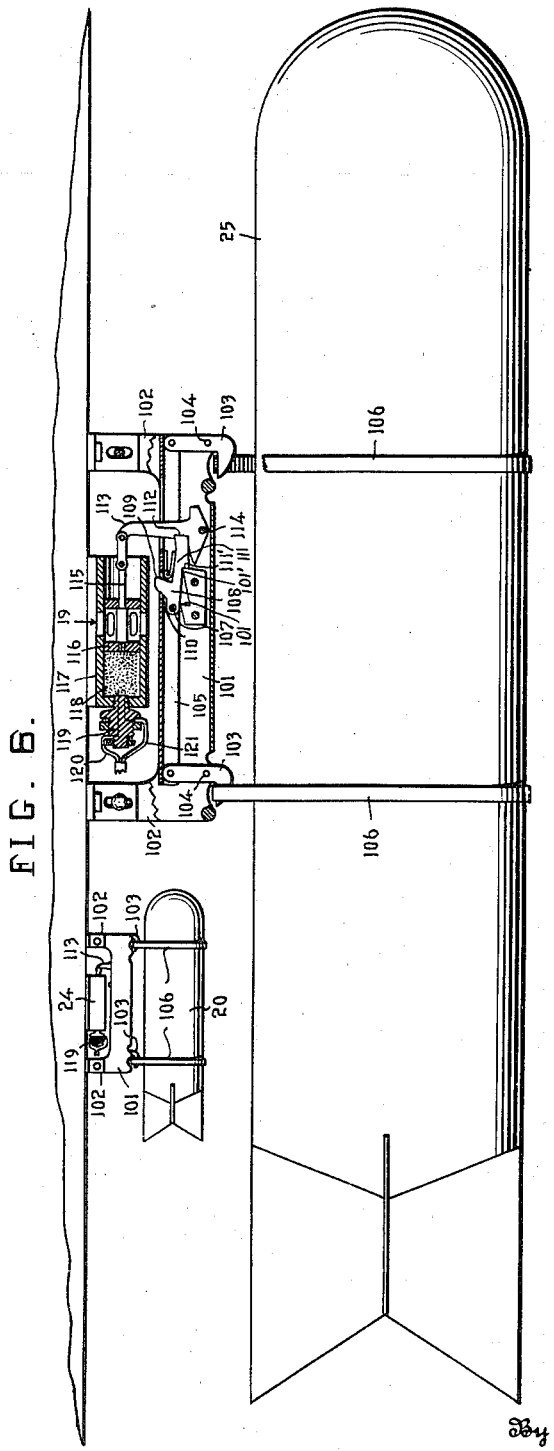
Inventor
Charles L. Kee
By
Attorney

UNITED STATES PATENT OFFICE 2,206,777

RANGE-FINDING AND PROJECTILE-RELEASING MEANS FOR AIRCRAFT

Charles L. Kee, Portsmouth, Va., assignor, by direct and mesne assignments, to William H. Finckel, Jr., trustee, Washington, D. C.

Application September 29, 1936, Serial No. 103,210

17 Claims. (Cl. 89—1)

This invention relates to a method of determining the range and dropping bombs from aircraft.

In dropping bombs from aircraft as now generally practiced, the human element enters into the range-finding, sighting and releasing of the bombs to such an extent that pronounced errors are made, and the percentage of hits obtained is relatively low.

Experimentation indicates that the errors referred to are due, primarily, to the fact that the bombs are manually, rather than automatically, released. Obviously, an error of only a fraction of a second will cause a bomb released from an aircraft travelling at normal speed to fall wide of its mark.

One object of the present invention is to reduce the error occasioned by the human element to the minimum by providing for automatic, properly timed release of a projectile with relation to a given speed of the aircraft by which it is carried.

Another object of the invention is to provide a method for suitably timed release of a projectile in accordance with a measurement previously taken from the projectile-carrying aircraft while in flight, such measurement being accurately determined with respect to a predetermined terrestrial point and the object to be struck by the projectile, and being, for practical purposes, independent of the altitude and speed of the aircraft.

A further object of the invention is to provide a method of correcting for the lateral drift of the aircraft, to thereby insure hitting a target when the aircraft is flying in a cross wind, thus making unnecessary flying directly down the wind, or against it, as is now the common practice in bomb dropping.

The invention contemplates a range-finding and projectile-releasing method for aircraft, in which a projectile, or a plurality of projectiles, may be released, as desired, from the aircraft, while in flight, by first releasing, from the aircraft, a spotting projectile, preferably in the form of a smoke bomb, flare bomb, or the like, determining, from the aircraft, the distance from the point of terrestrial contact of such spotting projectile to the object to be hit, and thereafter releasing a projectile to hit such object when the aircraft has travelled a distance from the point of release of the spotting projectile equal to such determined distance, the speed and altitude of the aircraft being, meanwhile, maintained constant; means being provided whereby certain steps of such method may be carried out automatically, all as will be explained hereinafter more fully and finally claimed.

In the accompanying drawings illustrating the invention, in the several figures of which like parts are similarly designated, Figure 1 is a chart illustrating, substantially in side elevation, the practice of the method of the invention.

Fig. 6 illustrates one means for supporting and releasing the projectiles.

Figure 1:
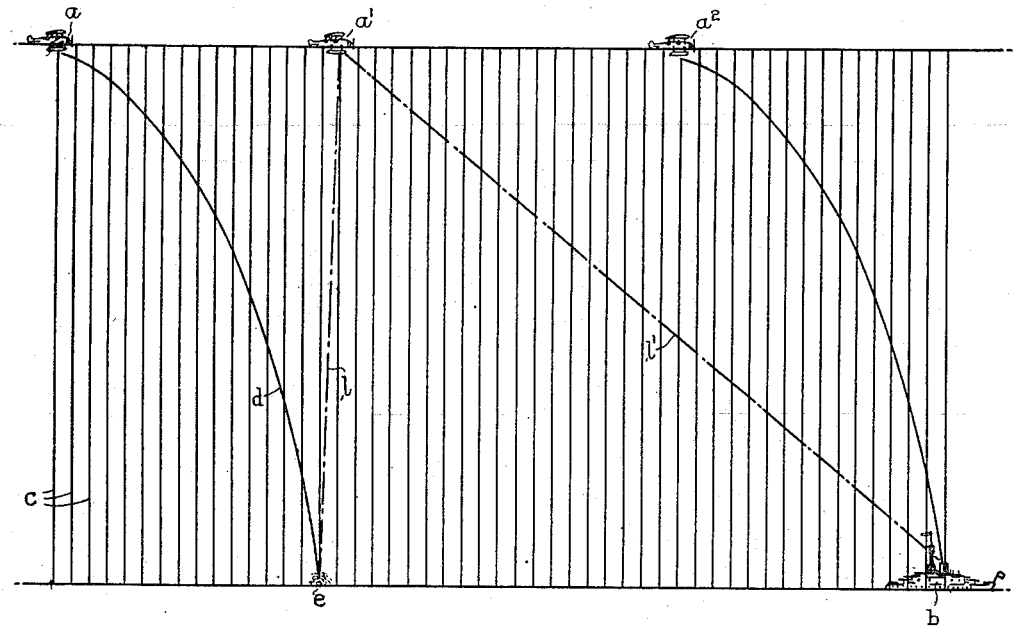

Referring particularly to Fig. 1, wherein the fundamental characteristics of the method of the invention are illustrated, an aircraft is shown in three positions $a$, $a'$, $a^2$, and the object to be hit by a projectile released from the aircraft is indicated at $b$ as a battleship.

In order that the method of the invention may function effectively, it is essential that the ground speed and altitude of the aircraft be maintained substantially constant throughout the period of time devoted to the bombing operation. Just what the altitude and ground speed of the aircraft may be is immaterial, as will be apparent from the description of the range-finding and bomb-dropping method steps hereinafter given.

Obviously, ideal conditions for bomb dropping from aircraft seldom exist, but the changes in conditions may generally be taken to recur with such regularity during the period of any given bomb-dropping operation as to effectively balance, thereby making unnecessary their consideration in determining errors which must be accounted for if the bomb-dropping operation is to be effective.

The ideal conditions for bomb dropping may be said to be those in which the target is stationary and capable of being approached either directly with or against the wind, in which the velocity of the wind remains substantially constant throughout the bomb-dropping operation, and in which no air pockets or other flaws occur having a tendency to upset the calculations of the bomber. Under such ideal conditions, the ground speed and altitude of the plane may be maintained constant, and the chance for error reduced to that incident to the human element, which ordinarily enters into the operation of determining the proper time for release of, and the actual releasing of the projectile or bomb.

Assuming, now, that ideal conditions exist, the graphic illustration of the bomb-dropping method of the invention as illustrated in Fig. 1 may be described as follows:—The observer (or bomber) having sighted the target, or object $b$ to be hit, the pilot is instructed to maintain a constant altitude and ground speed. This maintenance of altitude and speed will result in the aircraft approaching a position above the target $b$ upon a horizontal line and at a speed which requires no correction for error. In the diagrammatic illustration of Fig. 1 the vertical lines $c$ may be assumed to divide the distance from left to right into units of 100 feet. When the aircraft has approached the target to a point where observation thereof is made easy through known sighting devices, say a distance of approximately 5,000 feet therefrom, as indicated, the bomber releases a spotting projectile, such as a smoke or flare bomb which will emit a burst of smoke or flame only upon terrestrial contact. This projectile is preferably so designed as to have ballistic characteristics similar to those of the main or explosive projectile later to be released, and hence its trajectory will be practically identical with that of such main projectile. The spotting projectile released from the aircraft at the position $a$ may be assumed to follow the trajectory indicated by the line $d$ and to burst at $e$ upon terrestrial contact. As the aircraft continues its flight at constant ground speed and altitude, it will reach a position, for example that indicated at $a'$, from which, by the use of known instruments, (see for example the patents of Stanworth No. 1,206,481, dated Nov. 28, 1916, and Fitz Power, No. 1,311,994, dated Aug. 5, 1919) the distance from the burst $e$ of the spotting projectile to a certain portion, say the funnel, of the vessel or target $b$ may be measured. In view of the fact that the trajectory of the main projectile may, because of its ballistic characteristics, be assumed to be the same as that of the spotting projectile, if the main projectile is released from the aircraft when the latter has travelled a distance from the point of release $a$ of the spotting projectile equal to the distance $e$—$b$, which has been determined, the main projectile may be expected to make a direct hit upon the vessel or target $b$. As illustrated in Fig. 1 the distance $e$—$b$ is 3,500 feet and hence after the aircraft has travelled from the position $a$ to the position $a^2$, which is also 3,500 feet, the position $a^2$ is that at which the main projectile should be released from the aircraft.

As thus far described, the method of the invention may be practiced by manual release not only of the spotting projectile but of the main projectile, and the error due to the human element may creep in. However, as hereinbefore pointed out, one of the main objects of the invention is to reduce such error to the minimum, and this may be made possible by employing the automatic means hereinafter particularly described whereby, when the spotting projectile is released, mechanism operating in timed relation to the ground speed of the aircraft is set in motion, and when the distance $e$—$b$ is determined, this mechanism may be set to automatically release the main projectile when the distance $e$—$b$ has automatically been stepped off by such mechanism. In other words, actual release of the main projectile is not dependent upon manual operation of any trip, switch or the like, but is accomplished in response to a predetermined setting of automatic mechanism. Obviously, therefore, in the practice of the method of the invention using the automatic means referred to, after the bomber has released the spotting projectile, measured the distance $e$—$b$, and set the mechanism to release the main projectile after the aircraft has travelled the distance from $a$ to $a^2$, equal to the distance $e$—$b$, he has nothing further to do to effect release of the main projectile at the proper time to hit the object or target $b$.

Of course, if the target $b$ is moving, suitable correction may be made in direction of flight of the aircraft and in the distance to be flown prior to release of the main bomb.

Figure 2:
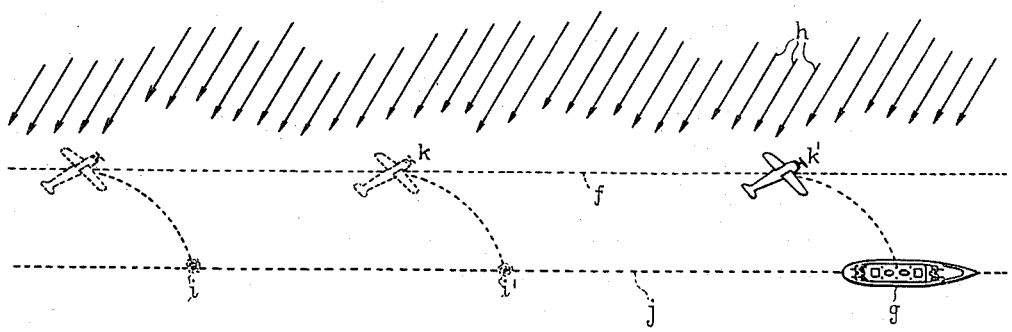
Fig. 2 is a diagrammatic plan view illustrating the modified practice of the method of the invention where correction is made for a cross wind.

As shown in Fig. 2, the course of flight of the aircraft is maintained constant and in a laterally offset straight line $f$ toward the target $g$ despite the cross wind indicated by the arrows $h$, by releasing from the aircraft a plurality, preferably two, of spotting projectiles the bursts $i$ and $i'$ of which, upon terrestrial contact, if they lie in alignment upon the line $j$, will indicate to the observer or bomber that the degree at which the aircraft is headed into the wind, as shown, is proper to maintain a direct course toward and over the target $g$. If the bursts $i$ and $i'$ do not align, a change in degree of steering of the aircraft is indicated, and appropriate correction may be made.

Of course, the ground speed and altitude of the aircraft are maintained constant and the dropping of the main bomb may be determined and controlled in the same manner as just described with reference to Fig. 1. Any of the bursts of the spotting projectiles may be used from which to measure the distance to the target $g$, but it is preferable to use the burst of the spotting projectile last released for the reason that, it being nearer to the target, there is less opportunity for error.

Hence, if the distance is measured from $i'$ to $g$, the main projectile will be released when the aircraft has reached the position $k'$ which is at a distance from the position $k$ at which the last spotting projectile was released equal to the distance $i'$—$g$.

Any appropriate known means may be employed for sighting the bursts of the spotting projectiles and the target to determine whether or not they are in alignment.

Figure 3:
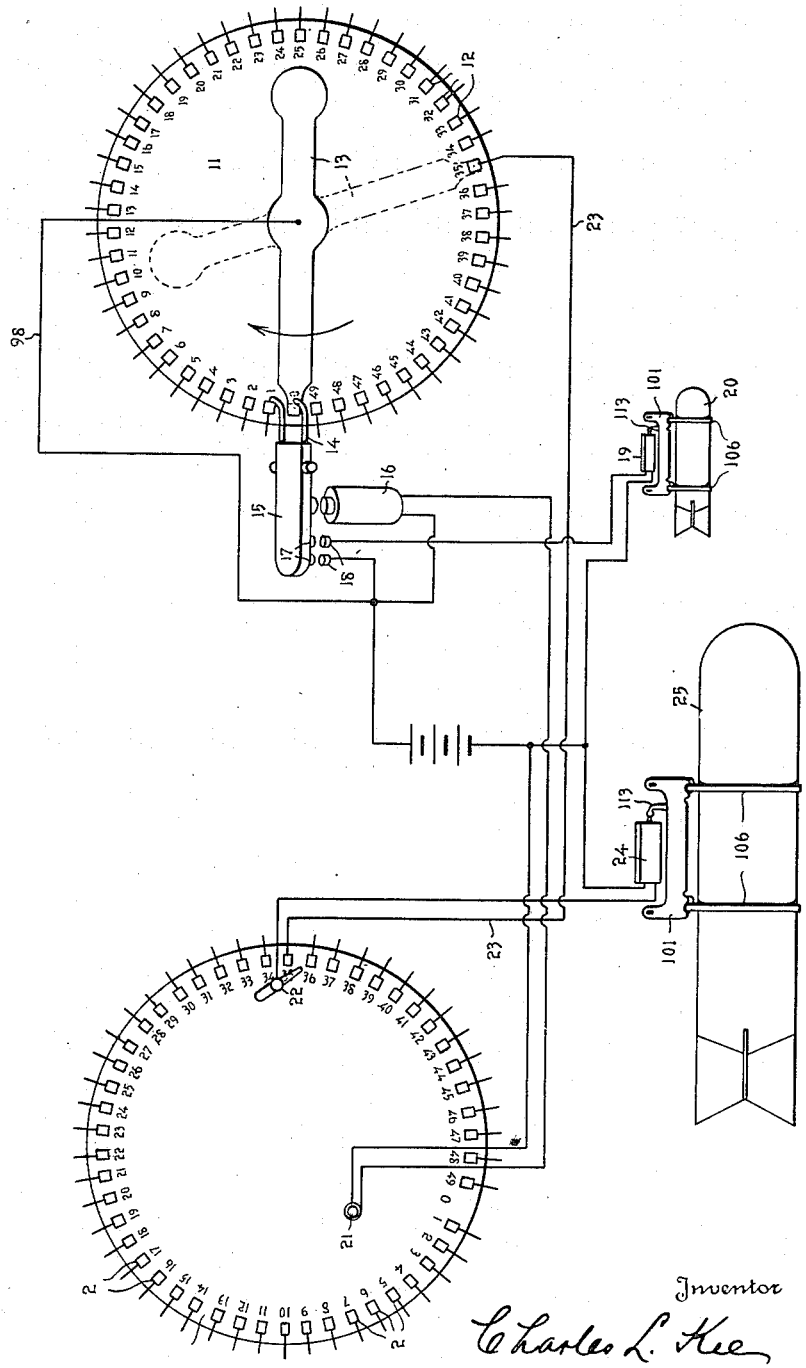
Fig. 3 is a semi-diagrammatic view illustrating appropriate apparatus whereby certain steps of the method of the invention may be performed automatically.
Figure 4:
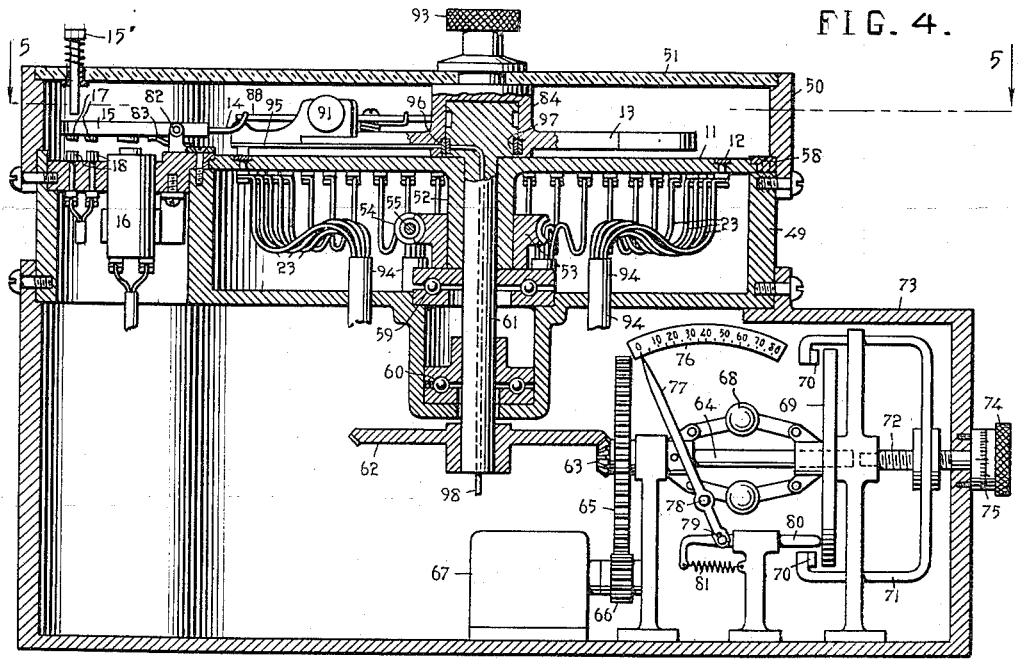
Fig. 4 illustrates, in sectional elevation, substantially on the line 4—4 of Fig. 5, rotary controller mechanism.
Figure 5:
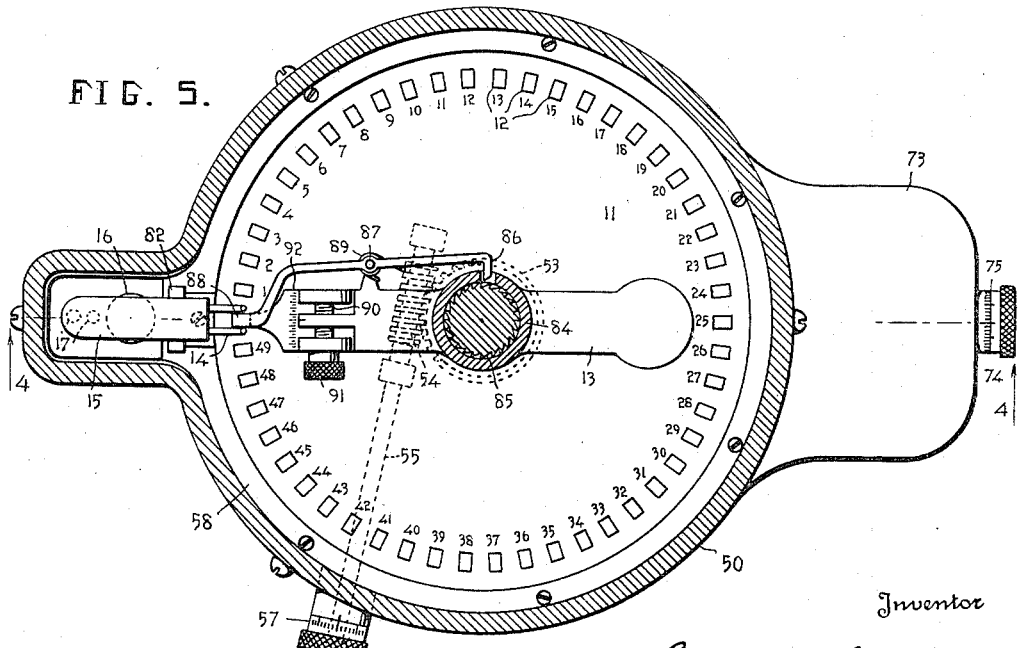
Fig. 5 is a sectional plan view taken substantially on the line 5—5 of Fig. 4.

Reserving to the description of Figs. 4 to 6 inclusive a detailed explanation of the apparatus which is considered to be especially well adapted to the carrying out of the method of the invention, an understanding of the functioning of such apparatus will be best had from a description of Fig. 3 wherein the essential characteristics of same are exemplified.

Although, as will later appear, a plurality of spotting projectiles and a plurality of main or explosive projectiles may be furnished for use, and suitable controls therefor provided in the apparatus, the disclosure of Fig. 3 shows, in the interest of clearness and simplicity, one spotting projectile and one main or explosive projectile and controls and electrical circuits connected therewith.

The apparatus includes a rotary member or disk 1, of suitable material, carrying a plurality of appropriately insulated electric contact elements 2 annularly arranged and preferably evenly spaced and representing distances of terrestrial measurement from 0 feet to any desired number of feet for which operation of the apparatus in accordance with the method of the invention may be adapted. As shown, the contact elements 2 bear indications from "1" to "49" which represent multiples of 100 feet, thus making the apparatus shown operative from 0 feet to 5,000 feet of terrestrial distance.

The disk 1 is mounted for rotation by any suitable means. Complemental to the disk 1, but preferably in a separately disposed instrument, is a disk 11 provided with a similar annularly arranged plurality of suitably insulated contact elements 12 over and in contact with which travels the end of a conductor arm 13 rotatable in timed relation to the ground speed of the aircraft, as hereinafter more particularly described. This arm is normally held in zero position, as shown in full lines, Fig. 3, by a yoke 14 carried by a trigger 15 tripped by means of an electromagnet 16 and provided with contact elements 17 complemental to contact points 18 in circuit with the releasing mechanism 19 of a spotting projectile 20.

Control of the circuit through the electromagnet 16 is effected by means of a push button 21 preferably arranged adjacent to the disk 1.

With the parts of the apparatus thus briefly described, the operation of the apparatus in accordance with the method of the invention may be explained as follows, reference being had particularly to Figs. 1 and 3:—When the aircraft reaches the position $a$ the bomber presses the button 21 which, by energizing the electromagnet 16, trips the trigger 15 and simultaneously drops the spotting projectile 20 and releases the arm 13 to permit it to immediately start rotation (clockwise) in timed relation to the ground speed of the aircraft.

Now, obviously, as the aircraft proceeds at uniform ground speed, the arm 13 will successively make contact with the members 12 stepping off upon the disk 11 the distance travelled by the aircraft.

When the aircraft reaches a suitable position such as $a'$ the bomber, by the use of known instruments, as mentioned, will measure distance $e$—$b$ and rotate the disk 1 to the appropriate corresponding position shown (Fig. 3) where when the relatively fixed switch button 22 is operated the contact 12 of disk 11 for 3,500 feet will be put in circuit by lead 23 and be ready to close a circuit through the projectile releasing means 24 to release the main projectile 25 when the arm 13 has travelled to the position indicated in broken lines.

Obviously, therefore, after the distance $e$—$b$ has been measured and the contact member 12 thus put in circuit, there is nothing more to be done by the bomber or observer for the reason that the projectile releasing circuit is automatically closed when the arm 13 has travelled to the position where its contact end is in engagement with the contact member 12 already put in circuit. Hence, the projectile 25 will be released automatically when the aircraft has travelled a distance from the point of release of the spotting projectile 20 equal to that measured from the burst $e$ of the spotting projectile to the target $b$ as stepped off by the rotating arm 13 which is automatically started simultaneously with the release of the spotting projectile 20.

It will be understood that corresponding contact members 2 and 12 of the disks 1 and 11 are all connected respectively by leads corresponding to the lead 23 shown.

A plurality of the push buttons 21 equal in number to, and for the purpose of controlling release of, a plurality of spotting projectiles 20, and a plurality of push buttons 22 equal in number to, and for the purpose of releasing, a plurality of main projectiles 25 may be provided. These push buttons 22 may be so spaced as to close electric circuits with a number of the contact elements 2 of the disk 1 successively spaced to represent terrestrial points at distances of 100 feet from each other, whereby, if desired, a number of the explosive or main projectiles may be successively released to strike a target at points spaced 100 feet apart (or at other desired intervals of distance) by operating selected push buttons 22 to put in circuit certain of the contact elements 2 of disk 1 with corresponding contact elements 12 of the disk 11.

Although the contact elements 2 and 12 have been shown and described as spaced to represent terrestrial distances of 100 feet, they may be otherwise appropriately spaced as desired. Hence, the buttons 22 may be so arranged as to release the main projectiles to strike the target at points greater or less than 100 feet apart.

Referring now to Figs. 4 and 5, in which an appropriate rotary controller mechanism is shown, it will be seen that the disk 11 carrying the contact elements 12 is mounted in a casing 49 having a cover 50 provided with a transparent cover plate 51 through which latter the observer or bomber may, if desired, view the operation of the controller mechanism. The disk 11 is preferably provided with an axially arranged sleeve or hub 52 carrying a worm wheel 53 with which meshes a worm 54 having a shaft 55 extending exteriorly of the casing and provided with a turn button or knob 56 carrying a vernier 57, the purpose of which will be explained hereinafter. The periphery of the disk 11 is engaged by a securing ring 58 which admits of its rotative adjustment in the casing while at the same time securing it against axial movement or displacement.

Through the sleeve 52, and through appropriate anti-friction bearings 59 and 60, extends a shaft 61 upon the upper end of which is journalled the arm 13, and the lower end of this shaft is provided with a bevel gear 62 meshing with a complemental driving pinion 63 on a shaft 64 to which rotation is imparted by a spur gear 65 which meshes with a complemental pinion 66 on the shaft of an electric motor 67.

Under normal operation of the mechanism, the motor 67 drives constantly, and hence the shaft 61 is constantly driven thereby. Inasmuch as the speed of rotation of the arm 13 must, as hereinbefore pointed out, be commensurate with the ground speed of the aircraft, it is necessary to provide some means whereby the speed of rotation of the shaft 61, which drives the arm 13 (in a manner to be explained), may be varied with respect to that imparted to it by the motor 67 through the gearing 62, 63, 65, 66. As one means of accomplishing this object, the mechanism may be provided with suitable mechanism including a fly-ball governor 68 turning with the shaft 64 and reacting upon a disk 69, which it rotates and to which it imparts sliding movement axially of the shaft, and with which cooperate stop members 70 carried by a yoke 71 adjustable axially with respect to the shaft 64 by a screw-threaded shaft 72 the end of which extends exteriorly of the enclosing casing 73 and carries a thumb nut 74 provided with a vernier 75 whereby the setting of the stop members may be determined. As a further means for indicating to the operator the ground speed for which rotation of the arm 13 is adjusted, there may be provided a scale 76 so located that it may be viewed through a sight opening, or otherwise this scale being calibrated to indicate ground speeds in feet per second from 0 to 800. With this scale cooperates a needle or pointer 77 pivoted at 78 upon some fixed part, and coupled at 79 to a sliding pin 80 the end of which is normally forced into engagement with the adjacent face of the disk 69 by a spring 81. Thus, as the disk 69 is moved axially in response to action of the fly-ball governor, the pointer 77 will be moved across the scale 76 and will come to rest at a point determined by the setting of the stop members 70. Thus, when the thumb nut 74 is adjusted for the ground speed of the aircraft, the stop members will govern the speed of rotation of the shaft 61, and hence of arm 13, by controlling the action of the fly-ball governor through the disk 69.

The trigger 15 is pivoted at 82 in a bracket mounted in the casing 49, and is normally held by a spring 83 in such position that the contact elements 17 are separated from the contact points 18 and the yoke 14 is in position to engage the contact end of the arm 13 to thereby prevent rotation of the arm.

Inasmuch as the arm 13 must be permitted to rotate only when the yoke 14 is elevated out of engaging position by oscillation of the trigger 15 under the influence of the electromagnet 16, and inasmuch as the shaft 61 is constantly driven under the influence of the motor 67, it is necessary to provide some sort of separable clutch mechanism between the arm 13 and the upper end of the shaft 61 cooperating therewith. As an appropriate exemplification of such a clutch mechanism, the upper end of the shaft 61 is shown as enlarged to provide a bearing for an axial sleeve or hub 84 of the arm 13, and carrying ratchet teeth 85 with which may be engaged a pawl 86 pivoted at 87 upon the arm 13 and having an extension 88 normally overlying the contact end of the arm 13 in position to be engaged therewith by the yoke 14. The pawl 86 is normally spring-pressed for engagement with the ratchet teeth 85 by means of an appropriate spring 89. By this arrangement it will be seen that immediately the yoke 14 is elevated out of engagement with the end of the arm 13 and the extension 88 of the pawl 86, the pawl will be pressed by spring 89 into engagement with the nearest tooth of the ratchet and will thereby lock the arm 13 upon the shaft 61 for clockwise rotation therewith.

Inasmuch as it is practically impossible to obtain immediate, lagless, functioning of mechanical parts, even when electrically tripped and operated, and particularly where operation of a clutch mechanism such, for example, as that illustrated is depended upon, means for adjusting the parts of the controller mechanism for correction of errors in timing incident to a lag thus occasioned have been provided. These means include construction of the arm 13 whereby its contact end may be made as a part separate from its main body and adjustable laterally with respect thereto by means of a screw 90 having a thumb nut 91, an appropriate vernier scale 92 furnishing the means for obtaining a reading of the extent of adjustment obtained.

Thus, if, by trial and error, or otherwise, the time interval of lag, or the errors in operation, due to starting and stopping of the parts of the controller mechanism for given speeds of rotation of the shaft 61 have been determined, appropriate adjustment of the contact end of arm 13 by the means described will be effective to compensate for such errors in the practical operation of the mechanism.

Obviously, after a bomb-dropping operation has been completed, it is necessary to reset the arm 13 to the 0 position, as shown in Fig. 5. This may be accomplished by means of a knob 93 connected with the axial sleeve 84 of the arm and extending through the cover plate 51 in a position easily accessible to the operator. A push button 15', or equivalent means, may be provided for depressing one end of the trigger 15 so that the end of arm 13 and the part 88 associated therewith may be returned into position between the parts of yoke 14.

As hereinbefore explained, each of the contact elements 12 is connected by means of a lead 23 with a corresponding contact element 2 of the disk 1. These leads 23 are illustrated in Fig. 4 as running to a plurality of multiple cables or conductors 94 appropriately located within the casing of the mechanism.

The contact end of the arm 13 carries an electrical conductor element 95 extending to a contact ring 96 carried by the axial sleeve 84 and in constant wiping engagement with a complemental contact ring 97 to which is connected a lead 98 whereby the circuit through the controller mechanism is completed, as previously described.

It will be apparent that the arrangement and number of the contact elements 12 are such as to accommodate the apparatus for operation within limits from 0 to 5,000 feet of terrestrial distance.

Obviously, it is possible to provide various appropriate and effective means 19 and 24 for quickly releasing the spotting projectiles, and main, or explosive, projectiles, respectively, and it is known that many devices have been provided for this purpose. However, in view of the fact that one of the objects of the present invention is to remove the objection of the error incident to faulty operation due to time losses, the projectile releasing means illustrated in detail in Fig. 6 have been devised as effective to reduce such time losses to the minimum. These means include a frame 101 adjustably supported by arms 102 from the aircraft and carrying a parallel link motion including the hooks 103 pivoted to the frame at 104 and to a longitudinally shiftable bar 105. The hooks 103 are adapted to engage straps 106 providing slings for the projectile 25 or 20. Pivoted at 107 to the bar 105 is a spring pressed trip member 108 of bell crank form having one arm in the form of a stop 109 engaging an opening 110 in the bar 105, and holding the bar against shifting by having its other arm 111 provided with a pawl 111' in normal interlocking engagement (as shown) with one tooth 101' of a double-toothed ratchet bar fixed upon the frame 101. The end of this arm 111 normally engages a notch 112 in a spring-pressed lever 113 pivoted at 114 in the frame 101 and connected with the piston rod 115 of the piston 116 of a cylinder 117 provided with an explosive charge 118 of powder, or the like, capable of being fired by suitable means such as a spark plug 119 the terminals of which are connected with leads 120 and 121 to which current is supplied when a circuit is established through the arm 13 of the controller mechanism and one of the contact elements 12 of the disk 11 thereof when one of the buttons 22 has been depressed. In operation, when the explosive charge 118 is fired, the piston 116 will be driven outwardly, and by means of its connection with the lever 113 will cause this lever to release the bell crank lever 108 thereby releasing its pawl 111' from the tooth 101' and permitting longitudinal shifting of the bar 105 under the influence of the weight of the projectile 25 or 20 suspended by the hooks 103 until the pawl 111' engages the other tooth 101" of the ratchet bar, the shifting of bar 105 being thereupon arrested by the stop 109 in engagement with opening 110. Thus the hooks will oscillate upon their pivots 104 to drop the slings 106 and release the projectile. In view of the practically instantaneous operation of this releasing mechanism under the influence of the explosive charge, it will be seen that the time interval between the establishment of the circuit through the firing plug 119 and actual release of the projectile is practically negligible. This time interval may, however, if desired, be compensated for by appropriate adjustment of the arm 13 as hereinbefore explained.

As previously mentioned, when dropping projectiles to strike a moving target, assuming that same is moving substantially in or counter to the direction of flight of the aircraft, correction for this movement must be made in the determination of the point of release of the projectile from the aircraft. If the target is moving in the same direction as the aircraft, a number of feet commensurate with the added travel of the target must be added to the measured distance e—b to determine the point at which the projectile must be released to strike the target, and if the target is moving counter to the aircraft a similar correction must be made by subtracting an appropriate number of feet from the distance e—b.

Such corrections can readily be made by adjustment of the disk 11 by means of the worm and wheel mechanism 54, 53. To add footage, the disk is rotated clockwise, and to subtract footage it is rotated counterclockwise. Obviously, the vernier scale 57 may read in terms of feet, knots, speed, or otherwise, as may be found most convenient.

It will be apparent that, by thus providing for adjustment of the disk 11, it is not necessary to make any alteration in the selection of the contact member 12 which is put in circuit by operation of a push button 22 and hence no added burden of calculation is placed upon the bomber or observer. Appropriate rotary adjustment of the disk 11 makes possible the desired correction by so displacing the contact member 12 already put in circuit as to delay or hasten contact therewith of the end of the rotating arm 13.

Obviously, the speed of the moving target may be estimated, or it may be determined by suitable instruments, or previously have been furnished to the bomber.

Various changes and modifications are contemplated as within the spirit of the invention and the scope of the following claims, it being understood, moreover, that the particular mechanisms illustrated in Figs. 3, 4, 5 and 6 are illustrative only of one embodiment of apparatus adapted for practical operation under the method claimed.

What I claim is:

1. A method of finding the range and dropping projectiles from aircraft in flight, comprising the steps of releasing from the aircraft a spotting projectile, noting the point of terrestrial contact of that projectile, determining, from the aircraft, the distance from such point of contact to the object to be hit, and thereafter releasing a projectile to hit said object when the aircraft has travelled a distance from the point of release of the spotting projectile equal to said determined distance.

2. A method of finding the range and dropping projectiles from aircraft in flight, comprising the steps of releasing from the aircraft a spotting bomb having ballistic characteristics similar to those of a projectile later to be released, noting the point of terrestrial contact of said bomb, determining, from the aircraft, the distance from such point of contact to the object to be hit, and thereafter releasing a projectile to hit said object when the aircraft has travelled a distance from the point of release of said bomb equal to said determined distance.

3. A method of finding the range and dropping projectiles from aircraft in flight, comprising the steps of releasing from the aircraft a spotting projectile, noting the point of terrestrial contact of that projectile, determining, from the aircraft, the distance from such point of contact to the object to be hit, and thereafter automatically releasing a projectile to hit said object when the aircraft has travelled a distance from the point of release of the spotting projectile equal to said determined distance.

4. A method of finding the range and dropping projectiles from aircraft in flight, comprising the steps of manually releasing from the aircraft a spotting projectile, noting the point of terrestrial contact of that projectile, determining, from the aircraft, the distance from such point of contact to the object to be hit, and thereafter automatically releasing a projectile to hit said object when the aircraft has travelled a distance from the point of release of the spotting projectile equal to said determined distance.

5. A method of finding the range and dropping projectiles from aircraft in flight, comprising the steps of releasing from the aircraft a spotting projectile and simultaneously setting in motion means operating in timed relation to the ground speed of the aircraft, noting the point of terrestrial contact of the spotting projectile, determining, from the aircraft, the distance from such point of contact to the object to be hit, and thereafter by said timed means automatically releasing a projectile to hit said object when the aircraft has travelled a distance from the point of release of the spotting projectile equal to said determined distance.

6. A method of finding the range and dropping projectiles from aircraft in flight, comprising the steps of releasing from the aircraft a spotting projectile and simultaneously setting in motion means operating in timed relation to the ground speed of the aircraft, noting the point of terrestrial contact of the spotting projectile, determining, from the aircraft, the distance from such point of contact to the object to be hit, preparing said timed means to release a projectile at the moment when the aircraft has travelled such determined distance, and thereafter by said timed means automatically releasing such projectile to hit said object when the aircraft has travelled the distance from the point of release of the spotting projectile equal to said determined distance.

7. A method of finding the range and dropping projectiles from aircraft in flight, comprising the steps of manually releasing from the aircraft a spotting projectile and by such releasing action simultaneously setting in motion means operating in timed relation to the ground speed of the aircraft, noting the point of terrestrial contact of the spotting projectile, determining, from the aircraft, the distance from such point of contact to the object to be hit, preparing said timed means to release a projectile at the moment when the aircraft has travelled such determined distance, and thereafter by said timed means automatically releasing such projectile to hit said object when the aircraft has travelled a distance from the point of release of the spotting projectile equal to said determined distance.

8. A method of finding the range and dropping projectiles from aircraft in flight, comprising the steps of releasing from the aircraft a spotting projectile, noting the point of terrestrial contact of that projectile, determining, from the aircraft, the distance from such point of contact to the object to be hit, and thereafter releasing a projectile to hit said object when the aircraft has travelled a distance from the point of release of the spotting projectile equal to said determined distance, the speed and altitude of the aircraft being, meanwhile, maintained substantially constant.

9. A method of finding the range and dropping projecting from aircraft in flight, comprising the steps of releasing from the aircraft a spotting projectile, noting the point of terrestrial contact of that projectile, determining, from the aircraft, the distance from such point of contact to the object to be hit, adding to or subtracting from such distance and amount sufficient to correct same for movement of said object with or counter to the direction of flight of the aircraft, and thereafter releasing a projectile to hit said object when the aircraft has travelled a distance from the point of release of the spotting projectile equal to said corrected determined distance.

10. Apparatus for dropping projectiles from aircraft in flight, including means for controlling the release of a projectile, and means operable to release a spotting projectile and to simultaneously start operation of said controlling means, said controlling means including means adjustable for automatic release of a projectile when the aircraft has travelled a determined distance from the point of operation of the means to release said spotting projectile.

11. Apparatus for dropping projectiles from aircraft in flight, including means for controlling the release of a projectile and operating in timed relation to the ground speed of the aircraft, means operable to release a spotting projectile and to simultaneously set in operation said controlling means, and means for adjusting said controlling means for automatic release of a projectile when the aircraft has travelled a determined distance from the point of release of said spotting projectile.

12. In apparatus for dropping projectiles from aircraft in flight, means for controlling the release of a projectile including a contact-carrying element adjustable for various terrestrial distances and switch mechanism including a part movable in timed relation to the ground speed of the aircraft, means for releasing a spotting projectile and simultaneously initiating movement of the movable part of said switch mechanism, the adjustment of said controlling means for a determined terrestrial distance preparing said switch mechanism for completion of an electric circuit through said control means and automatic release of a projectile when the aircraft has travelled such determined distance.

13. In apparatus for dropping projectiles from aircraft in flight, a contact-carrying member adjustable for various terrestrial distances, switch mechanism including a plurality of contact elements connected respectively with the contacts of said member, a rotative switch member cooperating with said contact elements and connected with a source of electrical energy, means for normally holding said rotative member against rotation, means for releasing a spotting projectile and simultaneously releasing said holding means to permit rotation of said rotative member, electrically operated projectile releasing means, and switch means cooperable with the contacts of said contact-carrying member for placing in circuit with said electrically operated projectile releasing means certain interconnected contacts and contact elements as determined by adjustment of said contact-carrying member for a determined terrestrial distance, said rotative member rotatable in timed relation to the ground speed of the aircraft and serving by engagement with said certain contact element to close a circuit through said electrically operated projectile releasing means to release a projectile when the aircraft has travelled a distance measured by said sighting instrument and for which said contact-carrying member has thereby been adjusted.

14. In apparatus for dropping projectiles from aircraft in flight, means for supporting a spotting projectile, manually operable means for releasing said spotting projectile, means for supporting a main projectile, and means for automatically releasing said main projectile including mechanism set in motion in response to manual release of said spotting projectile.

15. In apparatus for dropping projectiles from aircraft in flight, means for supporting a spotting projectile, manually actuated electrically operable means for releasing said spotting projectile, means for supporting a main projectile, and electrically operable means for automatically releasing said main projectile including switch mechanism set in motion in response to actuation of the electrically operable means for releasing said spotting projectile.

16. Apparatus as claimed in claim 13, in which the contact elements of said main projectile releasing means are mounted for angular adjustment relatively to the switch member cooperating therewith.

17. Apparatus as claimed in claim 13, in which means are provided for varying the speed of rotation of said switch member commensurate with the ground speed of said aircraft.

CHARLES L. KEE.